(12) United States Patent
Li

(10) Patent No.: US 8,485,692 B2
(45) Date of Patent: Jul. 16, 2013

(54) LED-BASED LIGHT SOURCE WITH SHARPLY DEFINED FIELD ANGLE

(75) Inventor: Jim W. Li, Fremont, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 13/601,276

(22) Filed: Aug. 31, 2012

(65) Prior Publication Data

US 2012/0327655 A1 Dec. 27, 2012

Related U.S. Application Data

(60) Provisional application No. 61/533,117, filed on Sep. 9, 2011, provisional application No. 61/566,994, filed on Dec. 5, 2011.

(51) Int. Cl.
*F21V 7/04* (2006.01)
*F21V 5/04* (2006.01)

(52) U.S. Cl.
USPC ....... 362/308; 362/327; 362/328; 362/311.02

(58) Field of Classification Search
USPC ......... 362/240–245, 247, 308–309, 327–328, 362/311.02, 249.02
See application file for complete search history.

(56) References Cited

U.S. PATENT DOCUMENTS

| | | | |
|---|---|---|---|
| 5,959,316 A | 9/1999 | Lowery | |
| 6,166,860 A | 12/2000 | Medvedev et al. | |
| 6,351,069 B1 | 2/2002 | Lowery et al. | |
| 6,504,301 B1 | 1/2003 | Lowery | |
| 6,586,882 B1 | 7/2003 | Harbers | |
| 6,600,175 B1 | 7/2003 | Baretz et al. | |
| 6,680,569 B2 | 1/2004 | Mueller-Mach et al. | |
| 6,812,500 B2 | 11/2004 | Reeh et al. | |
| 7,111,964 B2 * | 9/2006 | Suehiro et al. | 362/328 |
| 7,126,162 B2 | 10/2006 | Reeh et al. | |
| 7,250,715 B2 | 7/2007 | Mueller et al. | |
| 7,479,662 B2 | 1/2009 | Soules et al. | |

(Continued)

FOREIGN PATENT DOCUMENTS

| | | |
|---|---|---|
| EP | 2 378 339 A1 | 10/2011 |
| KR | 2009-0012883 A | 2/2009 |

OTHER PUBLICATIONS

International Search Report and Written Opinion mailed on Dec. 17, 2012 for PCT International Application No. PCT/US2012/053673 filed on Sep. 4, 2012, 11 pages.

(Continued)

*Primary Examiner* — Thomas Sember
(74) *Attorney, Agent, or Firm* — Silicon Valley Patent Group LLP

(57) ABSTRACT

A luminaire with an LED based illumination device having at least one LED includes a transmissive lens element that in combination with reflector is able to generate an output beam with a sharply defined large angle intensity profile. The reflector element is mounted to the LED based illumination device. The transmissive lens element includes first and second interior surfaces and third and fourth exterior surfaces. A portion of light emitted from the LED passes through the first interior surface and the third exterior surface and refracts towards an optical axis of the LED based illumination device, and the reflector element without interacting with the reflector element. Another portion of light emitted from the LED passes through the second interior surface and fourth exterior surface and refracts away from the optical axis to be reflected by the reflector element.

22 Claims, 10 Drawing Sheets

U.S. PATENT DOCUMENTS

| | | | |
|---|---|---|---|
| 7,503,676 B2 | 3/2009 | Sakumoto | |
| 7,564,180 B2 | 7/2009 | Brandes | |
| 7,614,759 B2 | 11/2009 | Negley | |
| 7,629,621 B2 | 12/2009 | Reeh et al. | |
| 7,748,872 B2 * | 7/2010 | Holder et al. | 362/308 |
| 7,901,108 B2 * | 3/2011 | Kabuki et al. | 362/235 |
| 8,231,250 B2 * | 7/2012 | Bailey | 362/328 |
| 8,267,553 B2 * | 9/2012 | Liang et al. | 362/328 |
| 2004/0207999 A1 | 10/2004 | Suehiro et al. | |
| 2006/0092644 A1 | 5/2006 | Mok et al. | |
| 2007/0081336 A1 | 4/2007 | Bierhuizen et al. | |

OTHER PUBLICATIONS

Machine Translation for Abstract in English for KR 2009-0012883-A published on Feb. 4, 2009 visited at www.espacent.com on Feb. 1, 2013, 1 page.

* cited by examiner

ND-BASED LIGHT SOURCE WITH
SHARPLY DEFINED FIELD ANGLE

CROSS REFERENCE TO RELATED APPLICATIONS

This application claims priority under 35 USC 119 to U.S. Provisional Application Nos. 61/533,117, filed Sep. 9, 2011, and 61/566,994, filed Dec. 5, 2011, both of which are incorporated by reference herein in their entireties.

TECHNICAL FIELD

The described embodiments relate to illumination modules that include Light Emitting Diodes (LEDs).

BACKGROUND

The use of light emitting diodes in general lighting is still limited due to limitations in light output level or flux generated by the illumination devices. Illumination devices that use LEDs also typically suffer from poor color quality characterized by color point instability. The color point instability varies over time as well as from part to part. Poor color quality is also characterized by poor color rendering, which is due to the spectrum produced by the LED light sources having bands with no or little power. Further, illumination devices that use LEDs typically have spatial and/or angular variations in the color. Additionally, illumination devices that use LEDs are expensive due to, among other things, the necessity of required color control electronics and/or sensors to maintain the color point of the light source or using only a small selection of produced LEDs that meet the color and/or flux requirements for the application.

Consequently, improvements to illumination device that uses light emitting diodes as the light source are desired.

SUMMARY

A luminaire with an LED based illumination device having at least one LED includes a transmissive lens element that in combination with reflector is able to generate an output beam with a sharply defined large angle intensity profile. The reflector element is mounted to the LED based illumination device. The transmissive lens element includes first and second interior surfaces and third and fourth exterior surfaces. A portion of light emitted from the LED passes through the first interior surface and the third exterior surface and refracts towards an optical axis of the LED based illumination device, and the reflector element without interacting with the reflector element. Another portion of light emitted from the LED passes through the second interior surface and fourth exterior surface and refracts away from the optical axis to be reflected by the reflector element.

Further details and embodiments and techniques are described in the detailed description below. This summary does not define the invention. The invention is defined by the claims.

DETAILED DESCRIPTION

Reference will now be made in detail to background examples and some embodiments of the invention, examples of which are illustrated in the accompanying drawings.

Figure 1:
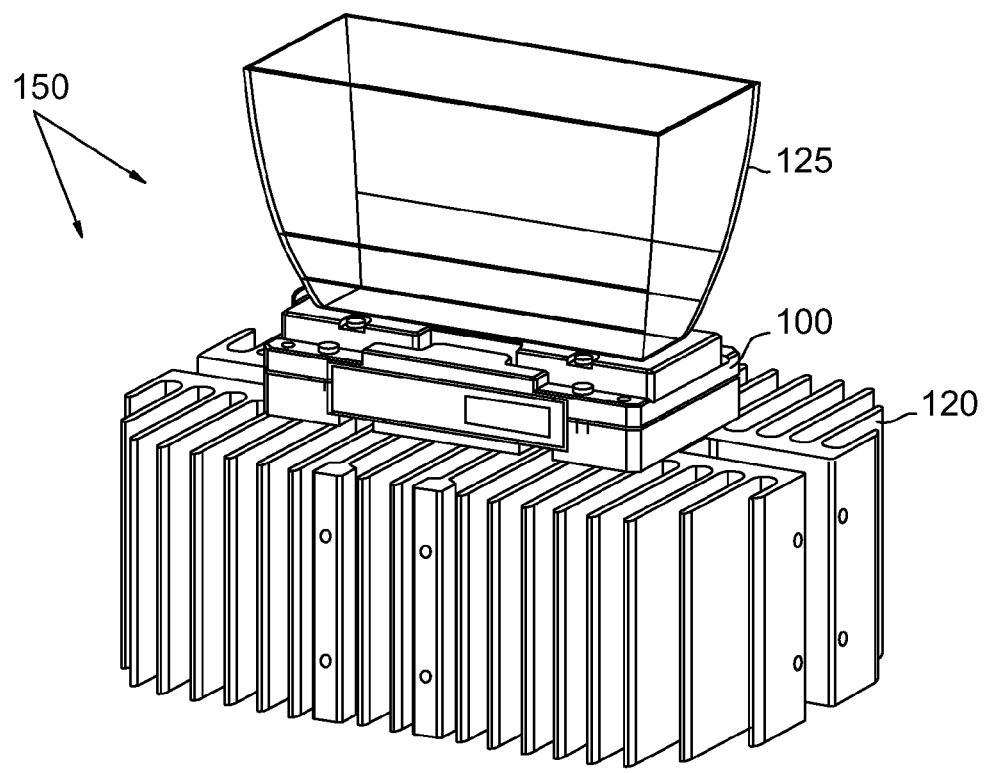
FIGS. 1, 2, and 3 illustrate three exemplary luminaires, including an illumination device, reflector, and light fixture.
Figure 2:
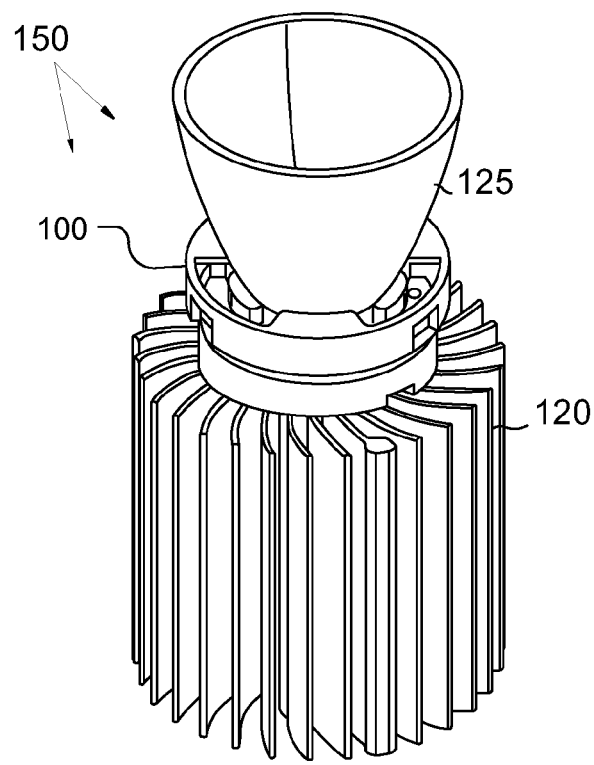
Figure 3:
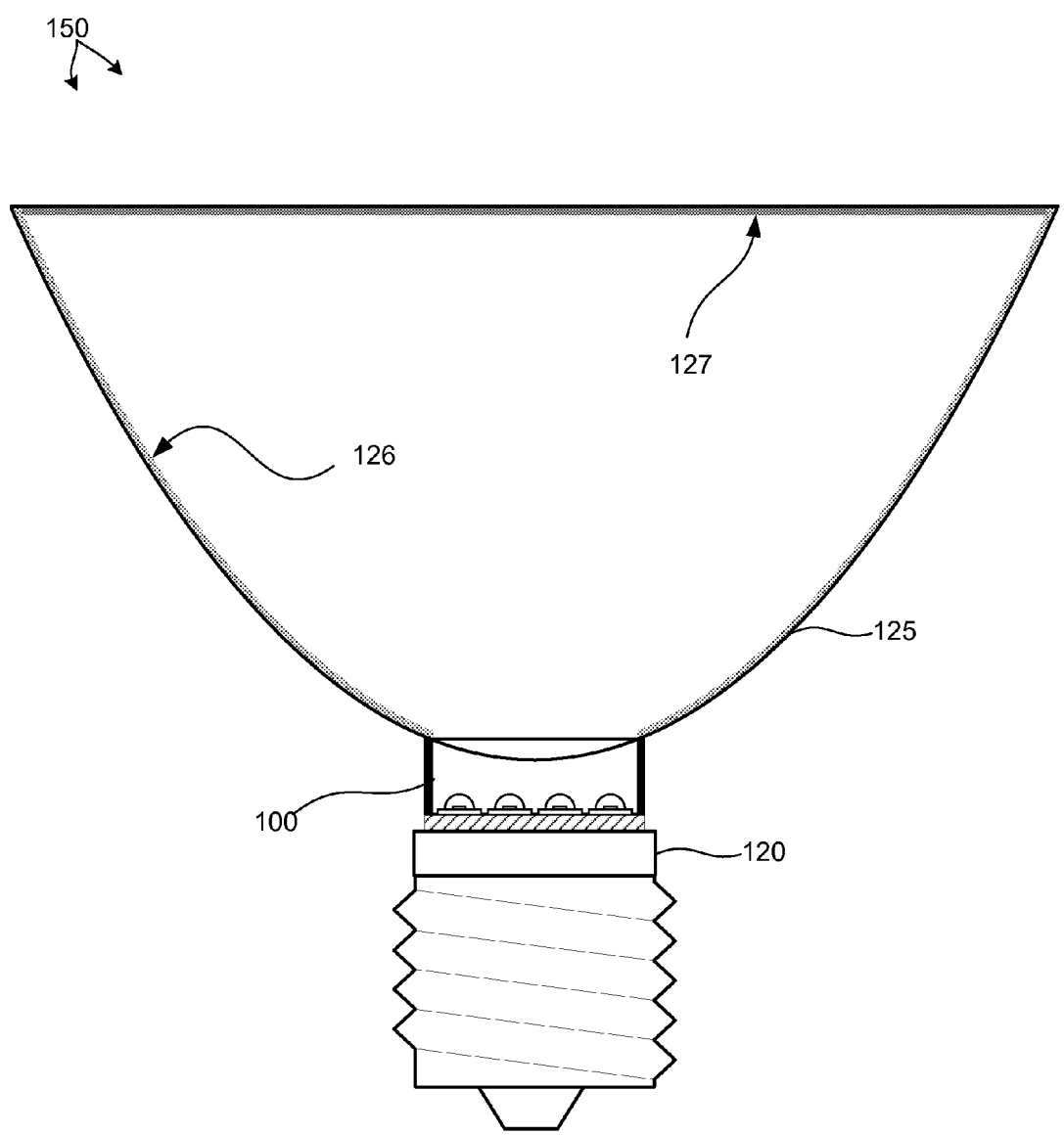

FIGS. 1, 2, and 3 illustrate three exemplary luminaires, all labeled 150. The luminaire illustrated in FIG. 1 includes an illumination module 100 with a rectangular form factor. The luminaire illustrated in FIG. 2 includes an illumination module 100 with a circular form factor. The luminaire illustrated in FIG. 3 includes an illumination module 100 integrated into a retrofit lamp device. These examples are for illustrative purposes. Examples of illumination modules of general polygonal and elliptical shapes may also be contemplated. Luminaire 150 includes illumination module 100, reflector 125, and light fixture 120. As depicted, light fixture 120 includes a heat sink capability, and therefore may be sometimes referred to as heat sink 120. However, light fixture 120 may include other structural and decorative elements (not shown). Reflector 125 is mounted to illumination module 100 to collimate or deflect light emitted from illumination module 100. The reflector 125 may be made from a thermally conductive material, such as a material that includes aluminum or copper and may be thermally coupled to illumination module 100. Heat flows by conduction through illumination module 100 and the thermally conductive reflector 125. Heat also flows via thermal convection over the reflector 125. Reflector 125 may be a compound parabolic concentrator, where the concentrator is constructed of or coated with a highly reflecting material. Optical elements, such as a diffuser or reflector 125 may be removably coupled to illumination module 100, e.g., by means of threads, a clamp, a twist-lock mechanism, or other appropriate arrangement. As illustrated in FIG. 3, the reflector 125 may include sidewalls 126 and a window 127 that are optionally coated, e.g., with a wavelength converting material, diffusing material or any other desired material.

As depicted in FIGS. 1, 2, and 3, illumination module 100 is mounted to heat sink 120. Heat sink 120 may be made from a thermally conductive material, such as a material that includes aluminum or copper and may be thermally coupled to illumination module 100. Heat flows by conduction through illumination module 100 and the thermally conductive heat sink 120. Heat also flows via thermal convection over heat sink 120. Illumination module 100 may be attached to heat sink 120 by way of screw threads to clamp the illumination module 100 to the heat sink 120. To facilitate easy removal and replacement of illumination module 100, illumination module 100 may be removably coupled to heat sink 120, e.g., by means of a clamp mechanism, a twist-lock mechanism, or other appropriate arrangement. Illumination module 100 includes at least one thermally conductive surface that is thermally coupled to heat sink 120, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 120 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module 100.

Figure 4:
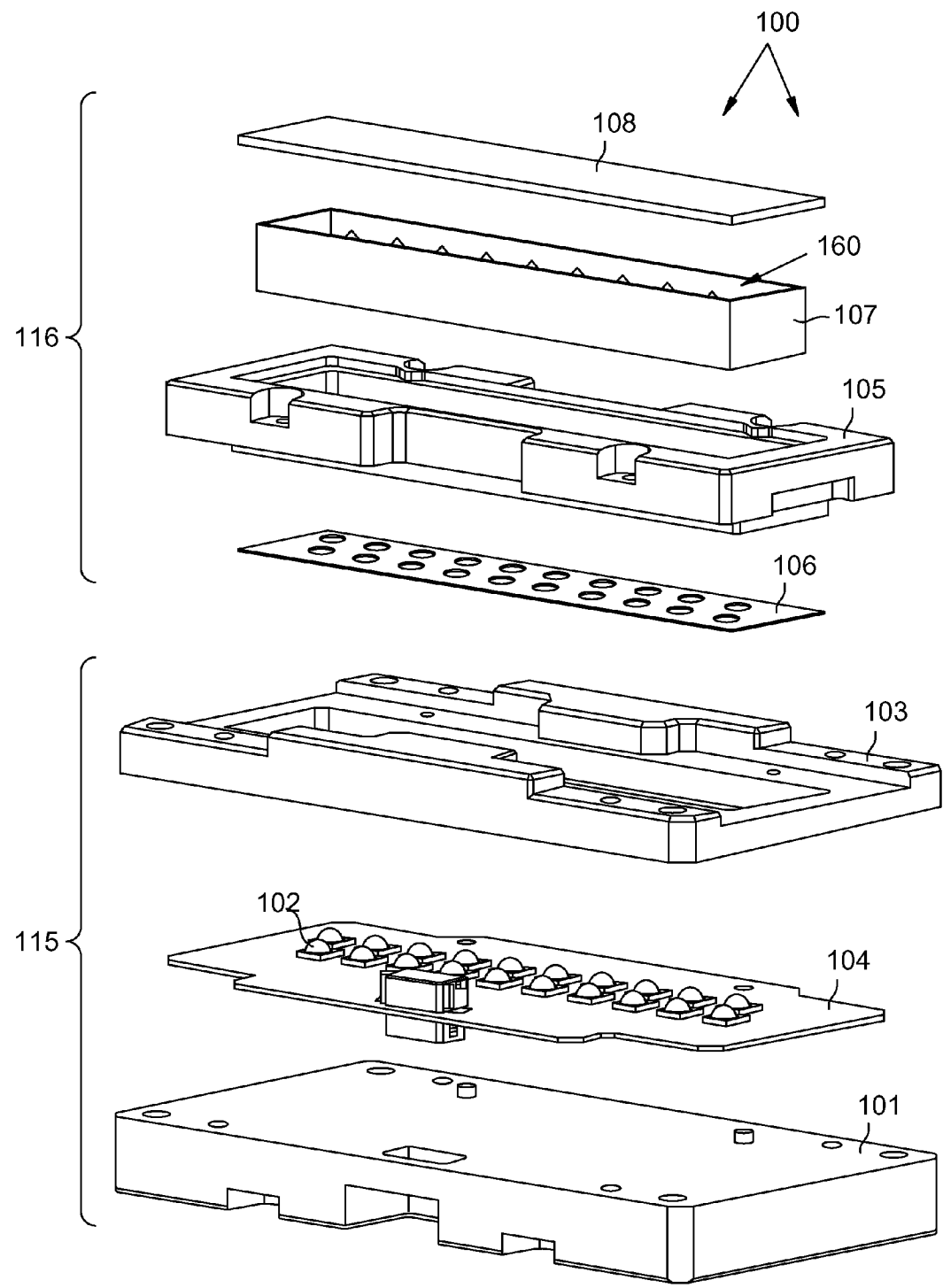
FIG. 4 illustrates an exploded view of components of the LED based illumination module depicted in FIG. 1.

FIG. 4 illustrates an exploded view of components of LED based illumination module 100 as depicted in FIG. 1 by way of example. It should be understood that as defined herein an LED based illumination module is not an LED, but is an LED light source or fixture or component part of an LED light source or fixture. For example, an LED based illumination module may be an LED based replacement lamp such as depicted in FIG. 3. LED based illumination module 100 includes one or more LED die or packaged LEDs and a mounting board to which LED die or packaged LEDs are attached. In one embodiment, the LEDs 102 are packaged LEDs, such as the Luxeon Rebel manufactured by Philips Lumileds Lighting. Other types of packaged LEDs may also be used, such as those manufactured by OSRAM (Oslon package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LED chip typically has a size about 1 mm by 1 mm by 0.5 mm, but these dimensions may vary. In some embodiments, the LEDs 102 may include multiple chips. The multiple chips can emit light of similar or different colors, e.g., red, green, and blue. Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and an output port, which is illustrated as, but is not limited to, an output window 108. Light conversion sub-assembly 116 may include a bottom reflector 106 and sidewall 107, which may optionally be formed from inserts. Output window 108, if used as the output port, is fixed to the top of cavity body 105. In some embodiments, output window 108 may be fixed to cavity body 105 by an adhesive. To promote heat dissipation from the output window to cavity body 105, a thermally conductive adhesive is desirable. The adhesive should reliably withstand the temperature present at the interface of the output window 108 and cavity body 105. Furthermore, it is preferable that the adhesive either reflect or transmit as much incident light as possible, rather than absorbing light emitted from output window 108. In one example, the combination of heat tolerance, thermal conductivity, and optical properties of one of several adhesives manufactured by Dow Corning (USA) (e.g., Dow Corning model number SE4420, SE4422, SE4486, 1-4173, or SE9210), provides suitable performance. However, other thermally conductive adhesives may also be considered.

Either the interior sidewalls of cavity body 105 or sidewall insert 107, when optionally placed inside cavity body 105, is reflective so that light from LEDs 102, as well as any wavelength converted light, is reflected within the cavity 160 until it is transmitted through the output port, e.g., output window 108 when mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination module 100, other shapes may be contemplated (e.g., clover shaped or polygonal). In addition, the interior sidewalls of cavity body 105 may taper or curve outward from mounting board 104 to output window 108, rather than perpendicular to output window 108 as depicted.

Bottom reflector insert 106 and sidewall insert 107 may be highly reflective so that light reflecting downward in the cavity 160 is reflected back generally towards the output port, e.g., output window 108. Additionally, inserts 106 and 107 may have a high thermal conductivity, such that it acts as an additional heat spreader. By way of example, the inserts 106 and 107 may be made with a highly thermally conductive material, such as an aluminum based material that is processed to make the material highly reflective and durable. By way of example, a material referred to as Miro®, manufactured by Alanod, a German company, may be used. High reflectivity may be achieved by polishing the aluminum, or by covering the inside surface of inserts 106 and 107 with one or more reflective coatings. Inserts 106 and 107 might alternatively be made from a highly reflective thin material, such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan). In other examples, inserts 106 and 107 may be made from a polytetrafluoroethylene PTFE material. In some examples inserts 106 and 107 may be made from a PTFE material of one to two millimeters thick, as sold by W. L. Gore (USA) and Berghof (Germany). In yet other embodiments, inserts 106 and 107 may be constructed from a PTFE material backed by a thin reflective layer such as a metallic layer or a non-metallic layer such as ESR, E60L, or MCPET. Also, highly diffuse reflective coatings can be applied to any of sidewall insert 107, bottom reflector insert 106, output window 108, cavity body 105, and mounting board 104. Such coatings may include titanium dioxide ($TiO_2$), zinc oxide (ZnO), and barium sulfate ($BaSO_4$) particles, or a combination of these materials.

Figure 5A:
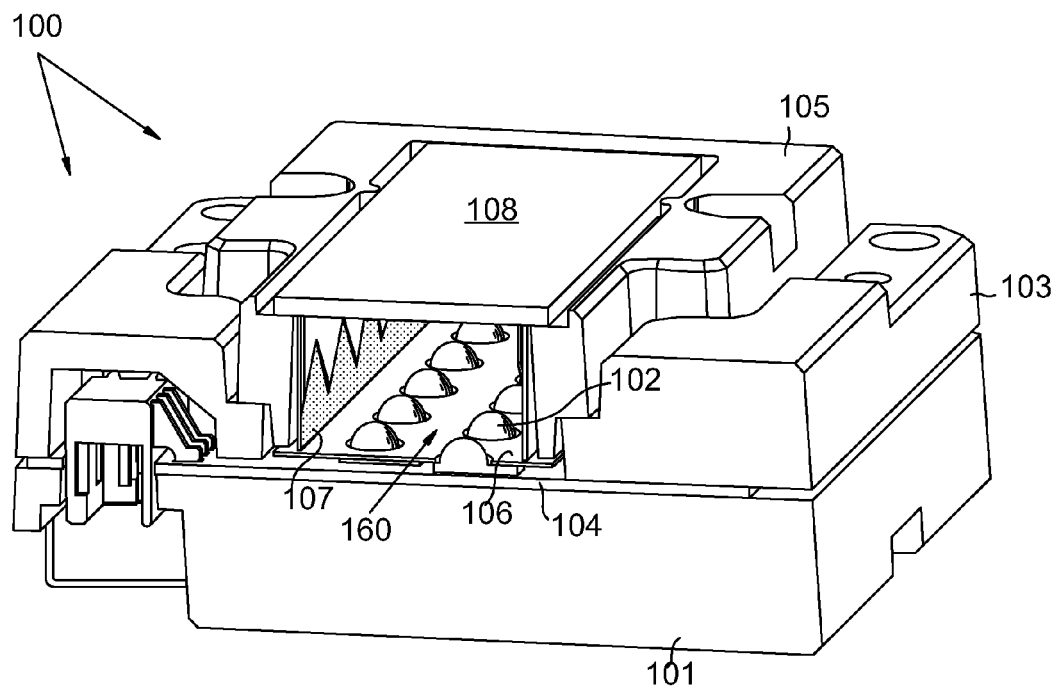
FIGS. 5A and 5B illustrate perspective, cross-sectional views of the LED based illumination module depicted in FIG. 1.
Figure 5B:
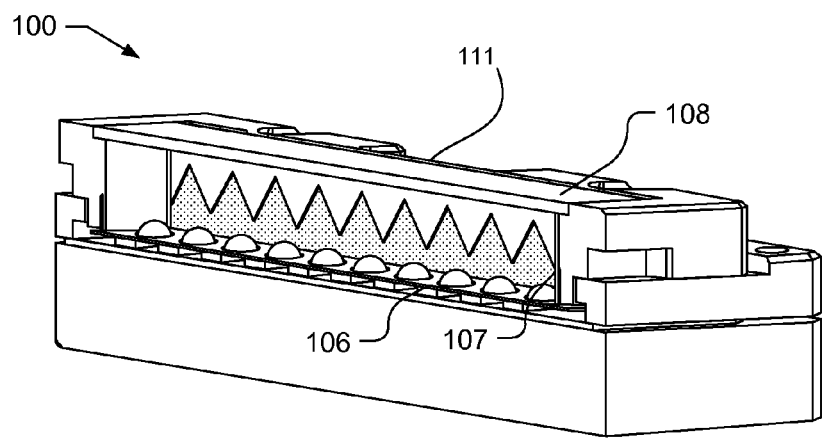

FIGS. 5A and 5B illustrate perspective, cross-sectional views of LED based illumination module 100 as depicted in FIG. 1. In this embodiment, the sidewall insert 107, output window 108, and bottom reflector insert 106 disposed on mounting board 104 define a color conversion cavity 160 (illustrated in FIG. 5A) in the LED based illumination module 100. A portion of light from the LEDs 102 is reflected within color conversion cavity 160 until it exits through output window 108. Reflecting the light within the cavity 160 prior to exiting the output window 108 has the effect of mixing the light and providing a more uniform distribution of the light that is emitted from the LED based illumination module 100. In addition, as light reflects within the cavity 160 prior to exiting the output window 108, an amount of light is color converted by interaction with a wavelength converting material included in the cavity 160.

As depicted in FIGS. 1-3, light generated by LEDs 102 is generally emitted from color conversion cavity 160, exits the output window 108, interacts with reflector 125, and exits luminaire 150. In one aspect, a transmissive lens element is introduced herein to sharply focus the light emitted from luminaire 150 into a predetermined far field angle. In this manner, light emitted from luminaire 150 appears uniformly intense at all points illuminated within the predetermined far field with a sharp drop off in intensity beyond the predetermined far field angle. In one aspect, the transmissive lens element includes a number of surfaces that collimates a portion of light emitted by LED based illumination module 100 such that this portion of light exits luminaire 150 without interacting with reflector 125. In addition, the transmissive lens element includes a number of surfaces that direct another portion of light emitted by LED based illumination module 100 toward reflector 125 such that reflector 125 collimates this portion of light that subsequently exits luminaire 150. In this manner, a more sharply defined output beam is generated by luminaire 150 compared to generally flooding the interior volume of reflector 125 with light emitted from LED based illumination module 100.

LEDs 102 can emit different or the same colors, either by direct emission or by phosphor conversion, e.g., where phosphor layers are applied to the LEDs as part of the LED package. The illumination module 100 may use any combination of colored LEDs 102, such as red, green, blue, amber, or cyan, or the LEDs 102 may all produce the same color light. Some or all of the LEDs 102 may produce white light. In addition, the LEDs 102 may emit polarized light or non-polarized light and LED based illumination module 100 may use any combination of polarized or non-polarized LEDs. In some embodiments, LEDs 102 emit either blue or UV light because of the efficiency of LEDs emitting in these wavelength ranges. The light emitted from the illumination module 100 has a desired color when LEDs 102 are used in combination with wavelength converting materials included in color conversion cavity 160. The photo converting properties of the wavelength converting materials in combination with the mixing of light within cavity 160 results in a color converted light output. By tuning the chemical and/or physical (such as thickness and concentration) properties of the wavelength converting materials and the geometric properties of the coatings on the interior surfaces of cavity 160, specific color properties of light output by output window 108 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

Portions of cavity 160, such as the bottom reflector insert 106, sidewall insert 107, cavity body 105, output window 108, and other components placed inside the cavity (not shown) may be coated with or include a wavelength converting material. FIG. 5B illustrates portions of the sidewall insert 107 coated with a wavelength converting material. Furthermore, different components of cavity 160 may be coated with the same or a different wavelength converting material.

By way of example, phosphors may be chosen from the set denoted by the following chemical formulas: $Y_3Al_5O_{12}:Ce$, (also known as YAG:Ce, or simply YAG) $(Y,Gd)_3Al_5O_{12}:Ce$, $CaS:Eu$, $SrS:Eu$, $SrGa_2S_4:Eu$, $Ca_3(Sc,Mg)_2Si_3O_{12}:Ce$, $Ca_3Sc_2Si_3O_{12}:Ce$, $Ca_3Sc_2O_4:Ce$, $Ba_3Si_6O_{12}N_2:Eu$, $(Sr,Ca)AlSiN_3:Eu$, $CaAlSiN_3:Eu$, $CaAlSi(ON)_3:Eu$, $Ba_2SiO_4:Eu$, $Sr_2SiO_4:Eu$, $Ca_2SiO_4:Eu$, $CaSc_2O_4:Ce$, $CaSi_2O_2N_2:Eu$, $SrSi_2O_2N_2:Eu$, $BaSi_2O_2N_2:Eu$, $Ca_5(PO_4)_3Cl:Eu$, $Ba_5(PO_4)_3Cl:Eu$, $Cs_2CaP_2O_7$, $Cs_2SrP_2O_7$, $Lu_3Al_5O_{12}:Ce$, $Ca_8Mg(SiO_4)_4Cl_2:Eu$, $Sr_8Mg(SiO_4)_4Cl_2:Eu$, $La_3Si_6N_{11}:Ce$, $Y_3Ga_5O_{12}:Ce$, $Gd_3Ga_5O_{12}:Ce$, $Tb_3Al_5O_{12}:Ce$, $Tb_3Ga_5O_{12}:Ce$, and $Lu_3Ga_5O_{12}:Ce$.

In one example, the adjustment of color point of the illumination device may be accomplished by replacing sidewall insert 107 and/or the output window 108, which similarly may be coated or impregnated with one or more wavelength converting materials. In one embodiment a red emitting phosphor such as a europium activated alkaline earth silicon nitride (e.g., $(Sr,Ca)AlSiN_3:Eu$) covers a portion of sidewall insert 107 and bottom reflector insert 106 at the bottom of the cavity 160, and a YAG phosphor covers a portion of the output window 108. In another embodiment, a red emitting phosphor such as alkaline earth oxy silicon nitride covers a portion of sidewall insert 107 and bottom reflector insert 106 at the bottom of the cavity 160, and a blend of a red emitting alkaline earth oxy silicon nitride and a yellow emitting YAG phosphor covers a portion of the output window 108.

In some embodiments, the phosphors are mixed in a suitable solvent medium with a binder and, optionally, a surfactant and a plasticizer. The resulting mixture is deposited by any of spraying, screen printing, blade coating, or other suitable means. By choosing the shape and height of the sidewalls that define the cavity, and selecting which of the parts in the cavity will be covered with phosphor or not, and by optimization of the layer thickness and concentration of the phosphor layer on the surfaces of color conversion cavity 160, the color point of the light emitted from the module can be tuned as desired.

In one example, a single type of wavelength converting material may be patterned on the sidewall, which may be, e.g., the sidewall insert 107 shown in FIG. 5B. By way of example, a red phosphor may be patterned on different areas of the sidewall insert 107 and a yellow phosphor may cover the output window 108. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 102 varies. The color performance of the LEDs 102, red phosphor on the sidewall insert 107 and the yellow phosphor on the output window 108 may be measured before assembly and selected based on performance so that the assembled pieces produce the desired color temperature.

In many applications it is desirable to generate white light output with a correlated color temperature (CCT) less than 3,100 Kelvin. For example, in many applications, white light with a CCT of 2,700 Kelvin is desired. Some amount of red emission is generally required to convert light generated from LEDs emitting in the blue or UV portions of the spectrum to a white light output with a CCT less than 3,100 Kelvin. Efforts are being made to blend yellow phosphor with red emitting phosphors such as CaS:Eu, SrS:Eu, SrGa2S4:Eu, Ba3Si6O12N2:Eu, (Sr,Ca)AlSiN3:Eu, CaAlSiN3:Eu, CaAlSi(ON)3:Eu, Ba2SiO4:Eu, Sr2SiO4:Eu, Ca2SiO4:Eu, CaSi2O2N2:Eu, SrSi2O2N2:Eu, BaSi2O2N2:Eu, Sr8Mg(SiO4)4Cl2:Eu, Li2NbF7:Mn4+, Li3ScF6:Mn4+, La2O2S:Eu3+ and MgO.MgF2.GeO2:Mn4+ to reach required CCT. However, color consistency of the output light is typically poor due to the sensitivity of the CCT of the output light to the red phosphor component in the blend. Poor color distribution is more noticeable in the case of blended phosphors, particularly in lighting applications. By coating output window 108 with a phosphor or phosphor blend that does not include any red emitting phosphor, problems with color consistency may be avoided. To generate white light output with a CCT less than 3,100 Kelvin, a red emitting phosphor or phosphor blend is deposited on any of the sidewalls and bottom reflector of LED based illumination module 100. The specific red emitting phosphor or phosphor blend (e.g. peak wavelength emission from 600 nanometers to 700 nanometers) as well as the concentration of the red emitting phosphor or phosphor blend are selected to generate a white light output with a CCT less than 3,100 Kelvin. In this manner, an LED based illumination module may generate white light with a CCT less than 3,100K with an output window that does not include a red emitting phosphor component.

It is desirable for an LED based illumination module, to convert a portion of light emitted from the LEDs (e.g. blue light emitted from LEDs 102) to longer wavelength light in at least one color conversion cavity 160 while minimizing photon losses. Densely packed, thin layers of phosphor are suitable to efficiently color convert a significant portion of incident light while minimizing losses associated with reabsorption by adjacent phosphor particles, total internal reflection (TIR), and Fresnel effects.

Figure 6:
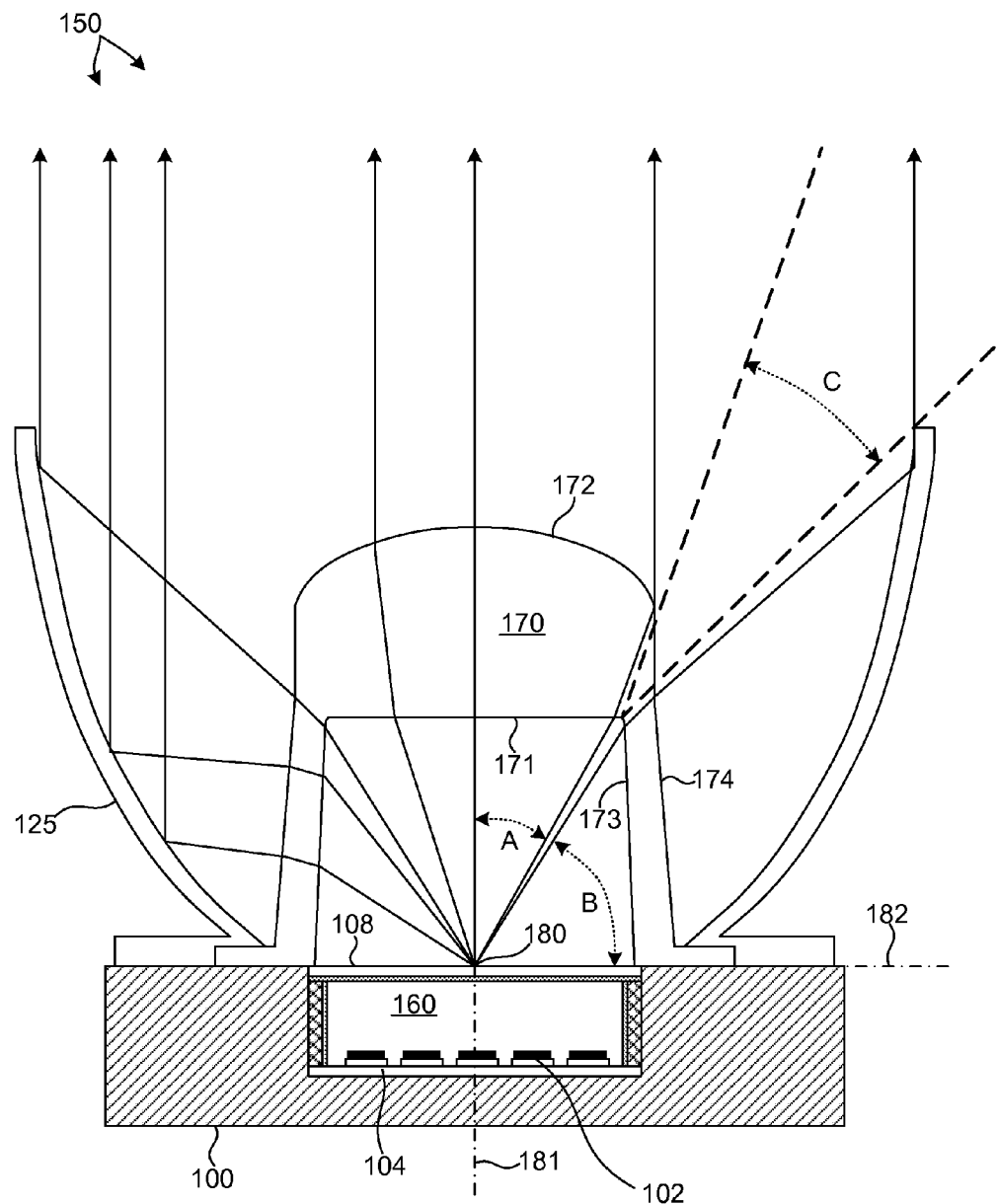
FIG. 6 is illustrative of a cross-sectional, side view of a luminaire with transmissive lens element in combination with reflector that is able to generate an output beam with a sharply defined large angle intensity profile.

FIG. 6 is illustrative of a cross-sectional, side view of luminaire 150 in one embodiment. As illustrated, luminaire 150 includes LED based illumination module 100, transmissive lens element 170, and reflector 125. Transmissive lens element 170 includes internal surfaces 171 and 173. In addition, transmissive lens element includes external surfaces 172 and 174. As depicted, LED based illumination module 100 has a circular shape (e.g., as illustrated in FIG. 2), however other shapes (e.g., as illustrated in FIG. 1) may be contemplated.

LED 102 of LED based illumination module 100 emits light directly into color conversion cavity 160. Light is mixed and color converted within color conversion cavity 160 and the resulting light is emitted by LED based illumination module 100. The light is emitted over an extended surface (i.e., the surface of output window 108). As depicted in FIG. 6, the emitted light passes through transmissive lens element 170 and is refracted such that the light emitted from LED based illumination module 100 is divided and directed into two distinct regions. A portion of the light emitted from LED based illumination module 100 is collimated by transmissive lens element 170 and exits luminaire 150 without interacting with reflector 125. Another portion of the emitted light that is distinct from the first portion is directed by the transmissive lens element 170 toward reflector 125. The light is then redirected by reflector 125 and exits luminaire 150.

Internal surfaces 171 and 173 are optically coupled to LED based illumination module 100. In some embodiments internal surfaces 171 and 173 are physically separated from the aperture (e.g., output window 108) of LED based illumination module 100. In some other embodiments, such as the embodiment illustrated in FIG. 6, internal surface 171 is physically separated from the aperture of LED based illumination module 100 and internal surface 173 extends from the aperture of LED based illumination module 100 toward internal surface 171.

As depicted, the internal surfaces 171 and 173 are separated from the aperture of LED based illumination module 100 by a volume. In some embodiments, this volume is filled with air. In other embodiments, the volume may be filled with a liquid or solid with an index of refraction that does not closely match the index of refraction of the material of transmissive lens element 170.

External surfaces 172 and 174 are physically separated from LED based illumination module 100 by the body of transmissive lens element 170. In addition, external surfaces 172 and 174 are physically separated from reflector 125 by a volume. In some embodiments, this volume is filled with air (index of refraction approximately equal to one). In other embodiments, the volume may be filled with a liquid or solid with an index of refraction that does not closely match the index of refraction of the material of transmissive lens element 170.

Surfaces 171 and 172 are shaped such that light incident on surface 171 is collimated as it passes through transmissive lens element 170. The resulting collimated light exits luminaire 150 as a nearly collimated, sharply defined output beam. In the embodiment depicted in FIG. 6, internal surface 171 is a planar surface that is oriented parallel to mounting board 104. As depicted in FIG. 6, external surface 172 is spherical in shape.

LED based illumination module 100 emits light over an extended surface (e.g., output window 108). For explanatory purposes, light emitted from a point 180 on output window 108 is highlighted and referenced in this patent document. However, it is understood that point 180 may be located anywhere on the light emitting surface of LED based illumination module 100.

A portion of the light emitted from point 180 falls within an angle, A, measured from an axis 181 oriented perpendicular to mounting board 104 and passing through point 180. Light within angle A is incident on internal surface 171, passes through transmissive lens element 170, and exits through external surface 172. The light is refracted within transmissive lens element 170 such that the light is directed to the target to be illuminated. Although in the depicted embodiment, external surface 172 is spherically shaped, other shapes may be contemplated. For example, external surface 172 may be a conical surface, a Bezier surface, an aspherical surface, a Fresnel surface, a Total Internal Reflection (TIR) surface, or a free form surface. In some examples, external surface 172 may include diffractive optical elements or photonic crystal surfaces. In some examples, external surface 172 may include a microlens array to promote light extraction and smooth the far field beam profile. In some examples, external surface 172 may be diffuse to promote light scattering and smooth the resulting far field beam profile. In some other examples, external surface 172 may include an absorbtive material to reduce the amount of light that exits luminaire 150 without interacting with reflector 125. By increasing the proportion of light directed to reflector 125 relative to the amount of light that is collimated by transmissive lens element 170 and exits luminaire 150 without interacting with reflector 125, a more narrow output beam profile is generated. Furthermore, although in the depicted embodiment, internal surface 171 is planar, other shapes may be contemplated. For example, internal surface 171 may be a spherical surface, a conical surface, a Bezier surface, an aspherical surface, a Fresnel surface, a Total Internal Reflection (TIR) surface, or a free form surface. In some examples, internal surface 171 may include diffractive optical elements or photonic crystal surfaces.

Figure 10:
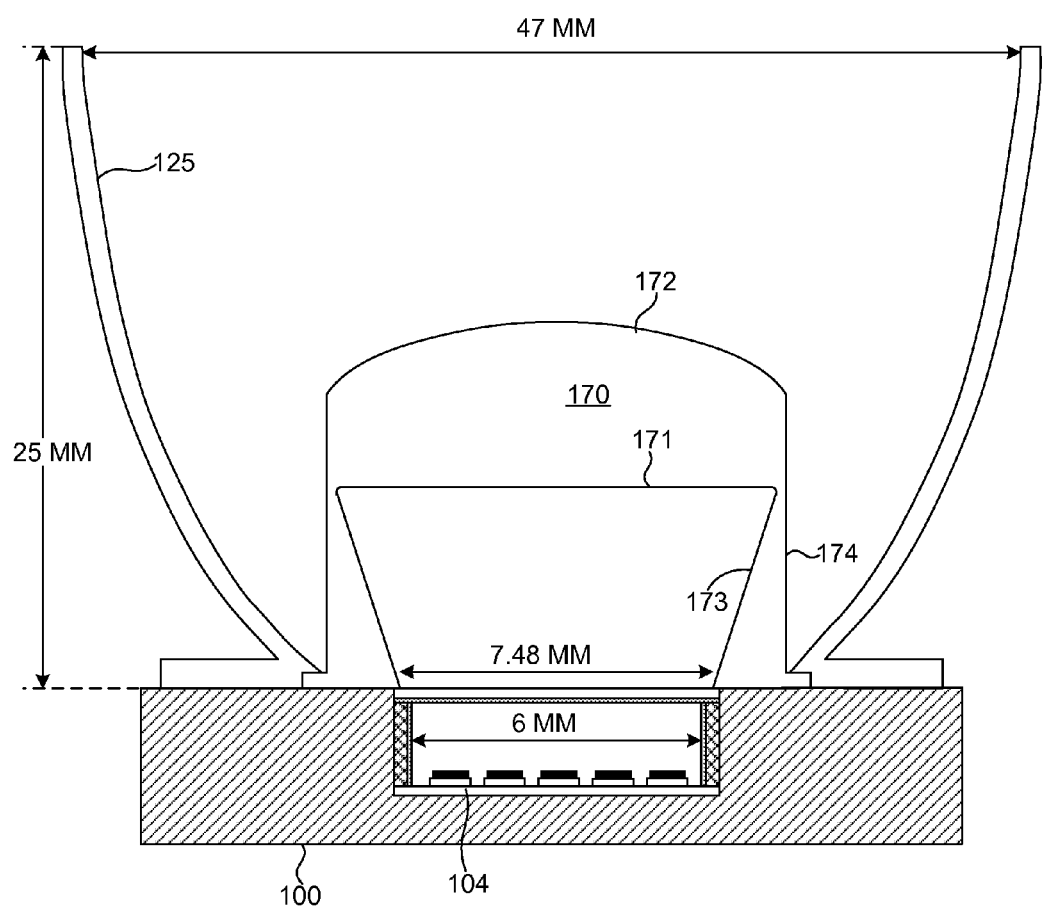
FIG. 10 is illustrative of a cross-sectional, side view of a luminaire with transmissive lens element with an internal surface having a cylindrically shaped surface that tapers outward from the base.

Surfaces 173 and 174 are shaped such that light incident on internal surface 173 is mainly directed toward reflector 125 as it passes through transmissive lens element 170. The light reflects off of reflector 125 and exits luminaire 150. In the embodiment depicted in FIG. 6, reflector 125 is parabolic in shape such that light incident on the internal surface of reflector 125 is nearly collimated. In some other embodiments, a uniform illumination of the target is desired. In these embodiments, a bat-wing emission pattern is more desirable and reflector 125 is shaped accordingly. In the embodiment depicted in FIG. 6, internal surface 173 is a cylindrically shaped surface. A taper may be included to facilitate release of transmissive lens element 170 if element 170 is manufactured by a molding process. External surface 174 is also cylindrically shaped, but includes a larger taper than internal surface 173. In this manner, light incident on internal surface 173 is refracted as it passes through transmissive lens element 170 such that the light is directed toward reflector 125. In another embodiment depicted in FIG. 10, internal surface 173 is a cylindrically shaped surface that tapers outward from the base of transmissive lens element 170. External surface 174 is also cylindrically shaped, and may include a smaller taper than internal surface 173. Due to the geometry depicted in FIG. 10, transmissive lens element 170 could not be molded as one part. Thus, it may be advantageous from a manufacturing perspective to adopt a design similar to that depicted in FIG. 6.

As depicted in FIG. 6, light is emitted from a point 180 on output window 108. A portion of the light emitted from point 180 falls within an angle, B, measured from an axis 182 oriented parallel to mounting board 104 and passing through point 180. Light within angle B is incident on internal surface 173, passes through transmissive lens element 170, and exits through external surface 174. The light is refracted within transmissive lens element 170 such that the light is directed to reflector 125. Although in the depicted embodiment, external surface 174 is shaped as a tapered cylinder, other shapes may be contemplated. For example, external surface 174 may be a spherical surface, a conical surface, a Bezier surface, an aspherical surface, a Fresnel surface, a Total Internal Reflection (TIR) surface, or a free form surface. In some examples, external surface 174 may include diffractive optical elements or photonic crystal surfaces. Furthermore, although in the depicted embodiment, internal surface 173 is cylindrically shaped, other shapes may be contemplated. For example, internal surface 173 may be a spherical surface, a conical surface, a Bezier surface, an aspherical surface, a Fresnel surface, a Total Internal Reflection (TIR) surface, or a free form surface. In some examples, internal surface 173 may include diffractive optical elements or photonic crystal surfaces.

Although, as depicted, the internal surface of reflector 125 is parabolically shaped, other shapes may be contemplated. For example, the internal surface of reflector 125 may an elliptical surface, an aspherical surface, a conical surface, a Bezier surface, or a free form surface. In some examples, reflector 125 may be a faceted reflector, may include dimpled features, or include microstructures at the reflective surfaces. Reflector 125 may include a diffuse surface to promote light scattering and smooth the far field beam profile. In some examples, reflector 125 may be made diffuse by molding. In some other examples, reflector 125 may be made diffuse by an electrical discharge machining (EDM) processing step.

As illustrated in FIG. 6, light emitted from LED based illumination module 100 enters transmissive lens element 170. A portion of the emitted light (e.g., the portion of light emitted from point 180 within angle A) is incident on internal surface 171, passes through the body of transmissive lens element 170, and exits through external surface 172. The shapes of internal surface 171 and external surface 172 are selected such that light passing through internal surface 171 and external surface 172 refracts generally in the direction of axis 181 (e.g., parallel to axis 181). In addition, another portion of the emitted light (e.g., the portion of light emitted from point 180 within angle B) is incident on internal surface 173, passes through the body of transmissive lens element 170, and exits through external surface 174. The shapes of internal surface 173 and external surface 174 are selected such that light passing through internal surface 173 and external surface 174 refracts in a direction away from axis 181 (e.g., perpendicular to axis 181) toward reflector 125.

In the embodiment depicted in FIG. 6, the angle A and angle B sum to approximately ninety degrees. In other words, transmissive lens element 170 is designed such that as much of the light emitted from LED based illumination module 100 is either incident on internal surface 171 or internal surface 173 within the limits of manufacture. In this manner very little light exits transmissive lens element 170 in a volume characterized by the angle, C. Light exiting transmissive lens element 170 in this volume is neither collimated toward axis 181 nor is incident on reflector 125. As such, this light broadens the distribution of the beam intensity in the far field and appears as a "shoulder" in the output beam. It is desirable to eliminate this "shoulder" by emitting as little light as possible in the volume characterized by angle C.

In addition, it is desirable to generate an output beam with a sharply defined intensity profile without an excessively tall reflector 125. However, as the height of reflector 125 is reduced, angle C becomes larger. Transmissive lens element 170 is designed such that a luminaire 150 with a relatively short reflector 125 is able to generate an output beam with a sharply defined large angle intensity profile. This is achieved by minimizing the amount of light emitted within angle C.

Figure 7:
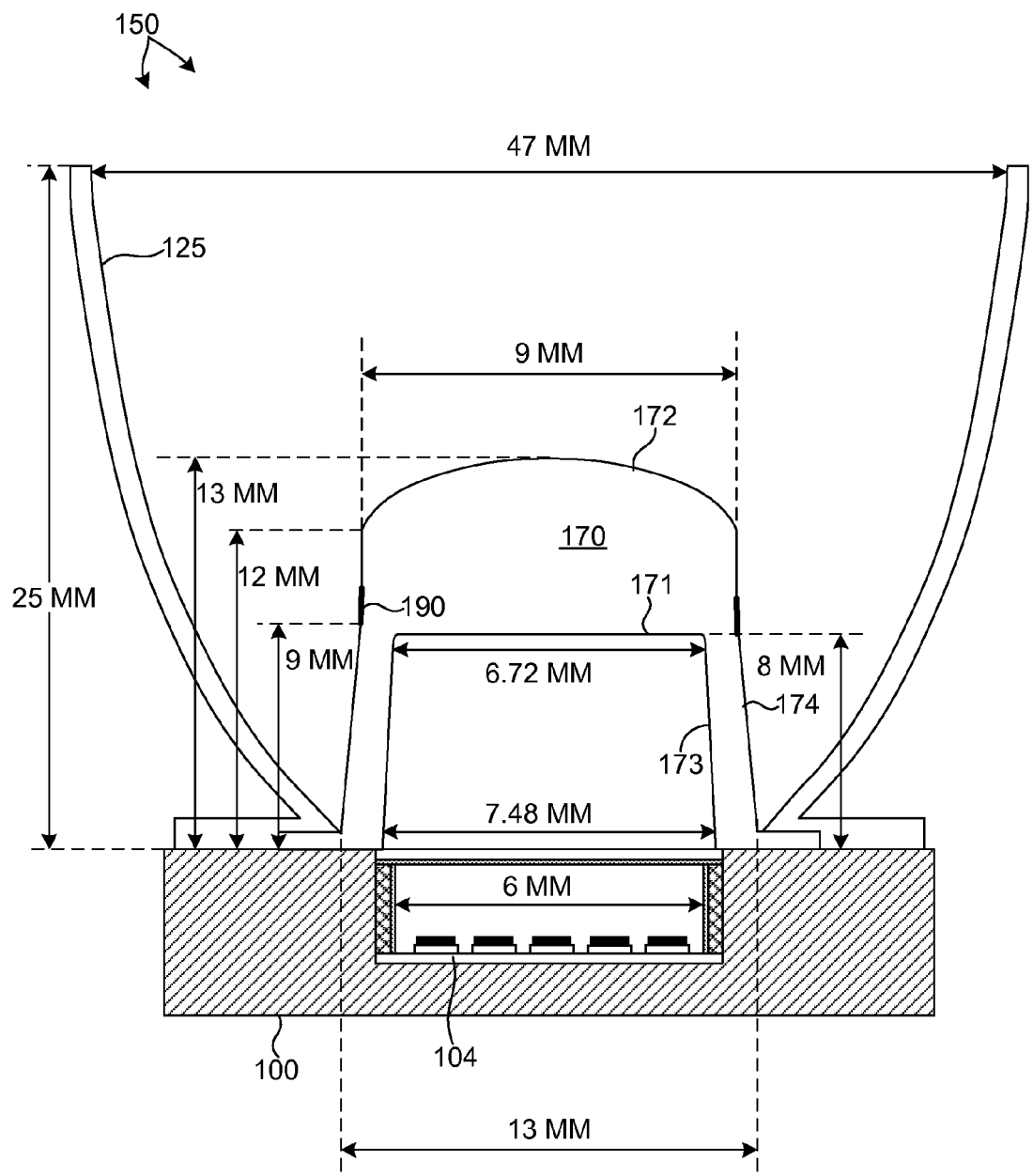
FIG. 7 is illustrative of a cross-sectional, side view of the luminaire described with reference to FIG. 6 with possible part dimensions.

FIG. 7 is illustrative of an embodiment of luminaire 150 with transmissive lens element 170 in combination with reflector 125 that is able to generate an output beam with a sharply defined large angle intensity profile as described with reference to FIG. 6. As depicted, external surface 172 is spherically shaped at the top and extends linearly toward its intersection with surface 174. External surface 174 tapers from a diameter of thirteen millimeters at the base to diameter of nine millimeters measured nine millimeters above the base. Internal surface 173 tapers from a diameter of 7.48 millimeters at the base to a diameter of 6.72 millimeters measured at a distance eight millimeters above the base. Internal surface 171 is a circularly shaped planar surface oriented parallel to the aperture of LED based illumination module 100 and located eight millimeters above the base of transmissive lens element 170. Reflector 125 has a height of approximately 25 millimeters and a diameter at the exit plane of the reflector of approximately 47 millimeters. In this embodiment, the dimensions of reflector 125 are selected to meet the requirements of the MR16 lighting format. However, in other embodiments, other dimensions may be selected.

Transmissive lens element 170 may be constructed from transmissive materials (e.g., optical grade PMMA, Zeonex, etc.). Transmissive lens element 170 may be formed by a suitable process (e.g., molding, extrusion, casting, machining, etc.). Transmissive lens element 170 may be constructed from one piece of material or from more than one piece of material joined together by a suitable process (e.g., welding, gluing, etc.).

Figure 8:
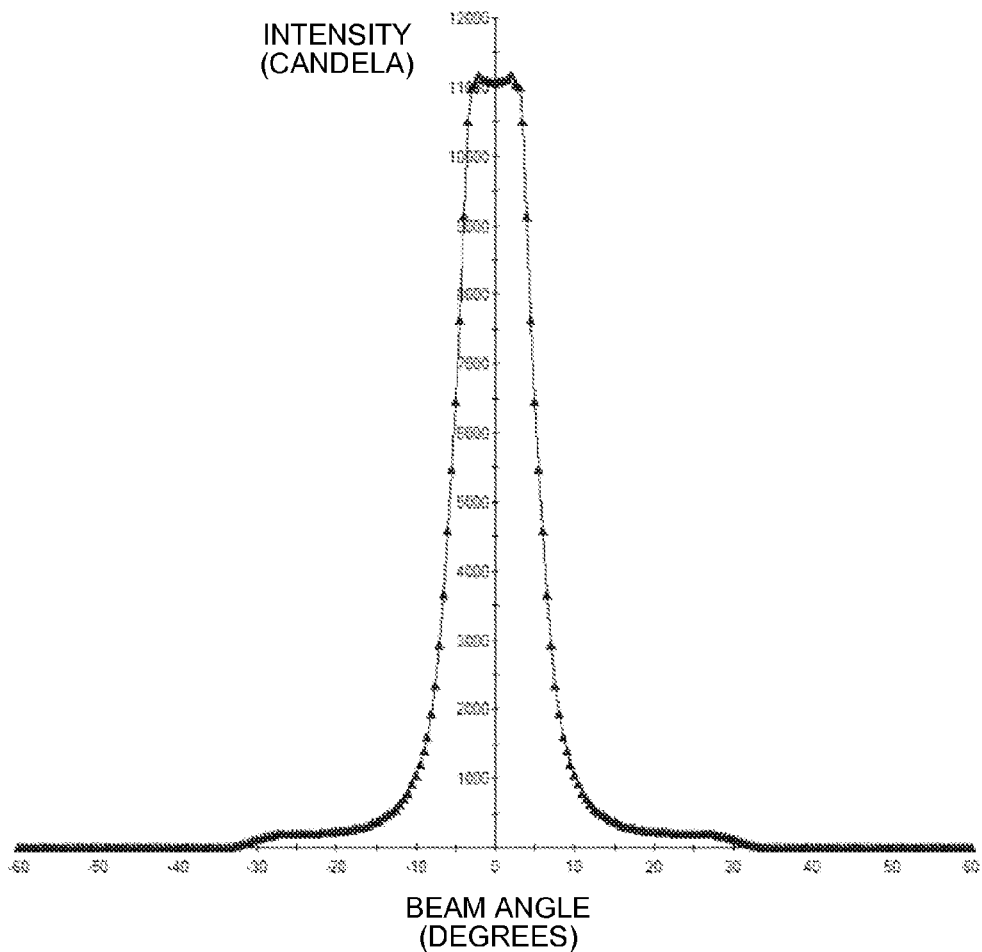
FIG. 8 is illustrative of a simulated large angle intensity profile over angle for a luminaire without a transmissive lens element.

FIG. 8 is illustrative of a simulated large angle intensity profile over angle for the luminaire 150 described with reference to FIG. 7 without transmissive lens element 170. Note that peak intensity is realized within five degrees of the center of the beam (e.g., axis 181) and intensity falls of sharply within ten degrees of the center of the beam. However, significant intensity remains between ten degrees and thirty degrees. In particular, approximately three percent of peak beam intensity remains between twenty and thirty degrees from the center of the beam. This appears as a pronounced "shoulder" in the output beam that is undesirable in many general lighting applications.

Figure 9:
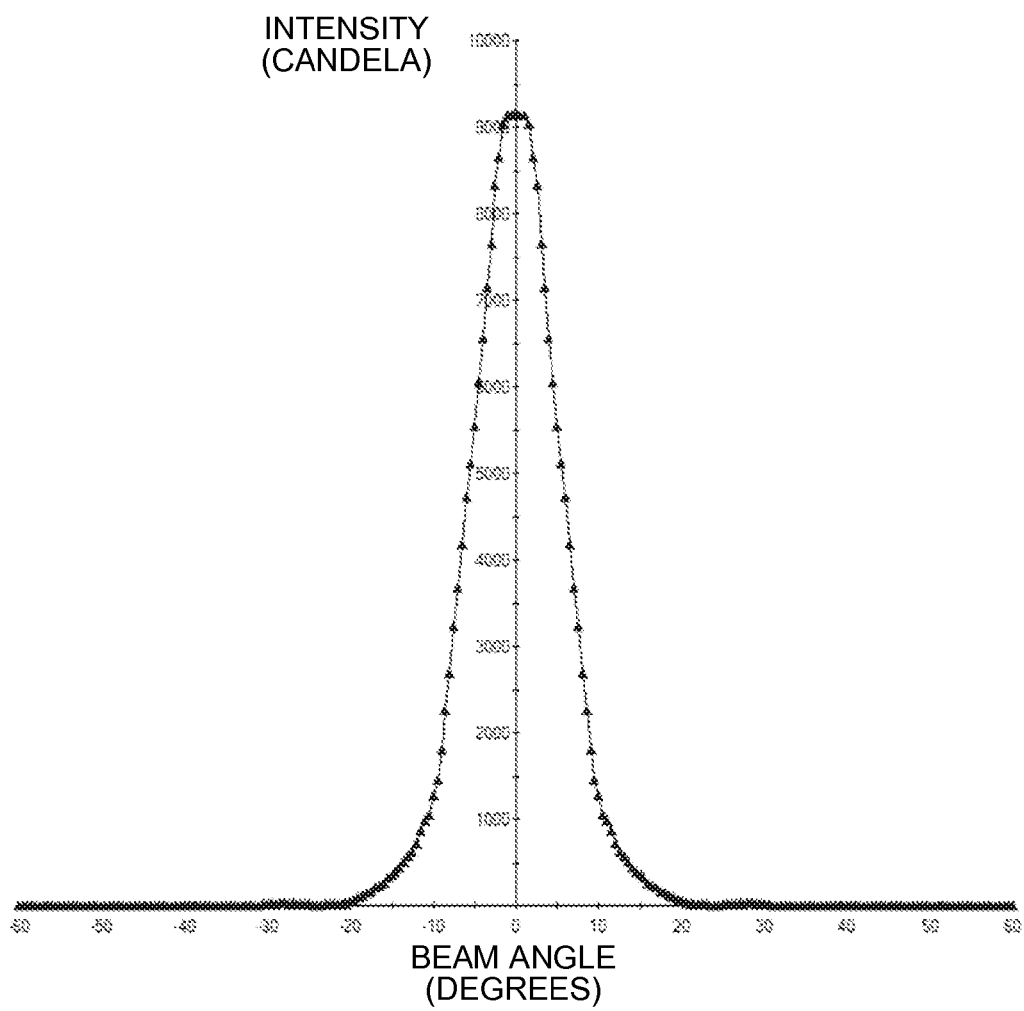
FIG. 9 is illustrative of a simulated large angle intensity profile over angle for the luminaire described with reference to FIG. 7 with a transmissive lens element.

FIG. 9 is illustrative of a simulated large angle intensity profile over angle for the luminaire 150 described with reference to FIG. 7 with transmissive lens element 170. Again, peak intensity is realized within five degrees of the center of the beam (e.g., axis 181) and intensity falls of sharply within ten degrees of the center of the beam. However, intensity continues to drop off between ten degrees and twenty degrees until very little light remains. In particular, less than one percent of peak beam intensity remains between twenty and thirty degrees from the center of the beam. This reduction in output beam intensity causes the pronounced "shoulder" in the output beam to effectively disappear. This results in a sharply defined output beam that is desirable in many general lighting applications.

As depicted in FIGS. 7 and 9, the ratio between the height of reflector 125 and the diameter of the aperture of LED based illumination module 100 is less than 5:1, yet the large angle intensity is less than one percent of the peak intensity for angles greater than twenty degrees from the center axis. In addition, the ratio between the diameter at the exit plane of the reflector and the diameter of the aperture of the LED based illumination module is less than 8:1, yet the large angle intensity is less than one percent of the peak intensity for angles greater than twenty degrees from the center axis. By adding an anti-reflective coating to the surfaces of transmissive lens element 170, reflective losses may be minimized and it may be possible to achieve large angle intensity less than one-half of one percent of the peak intensity for angles greater than twenty degrees from the center axis. In particular, surfaces 173 and 174 may include an anti-reflective coating to minimize discontinuities in the output beam intensity profile.

Figure 11:
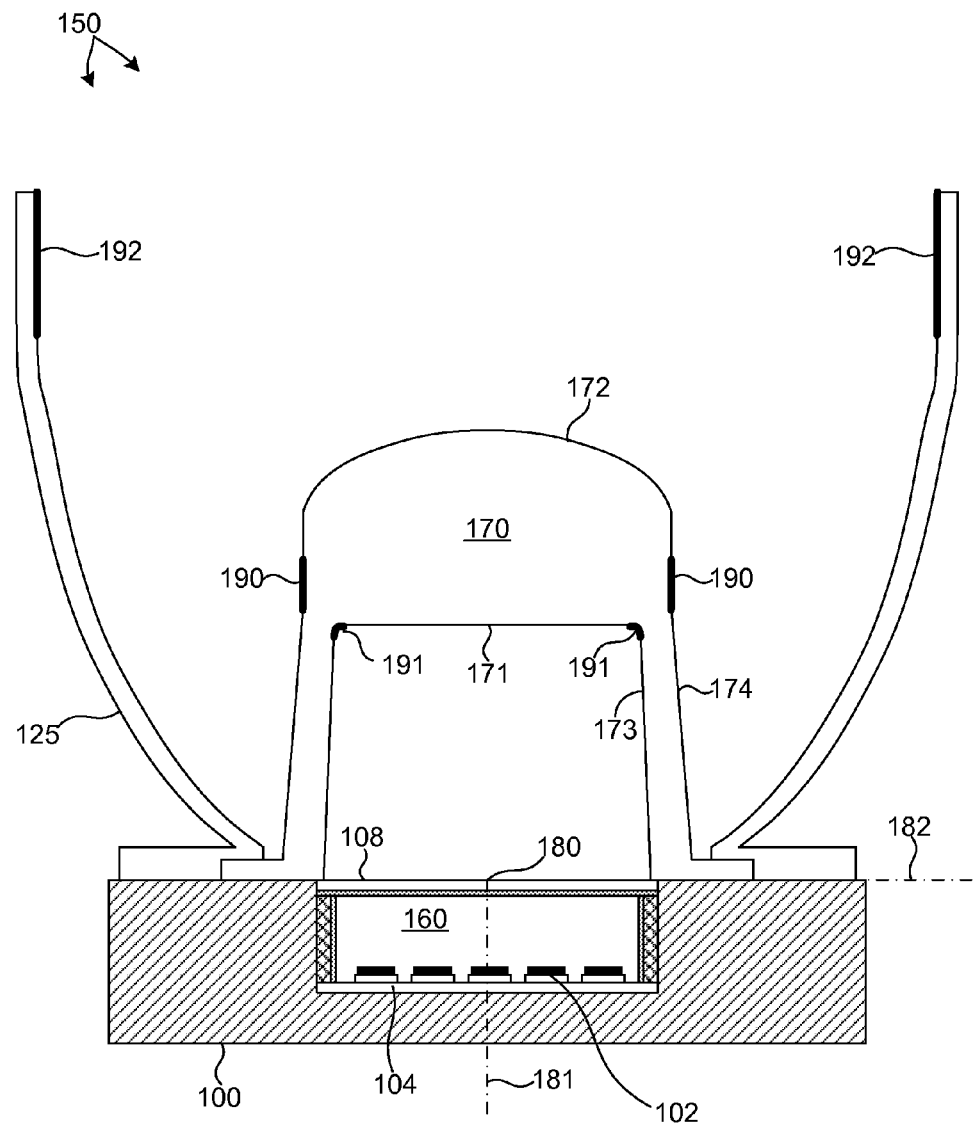
FIG. 11 is illustrative of a cross-sectional, side view of another luminaire with transmissive lens element that in combination with reflector that is able to generate an output beam with a sharply defined large angle intensity profile.

FIG. 11 is illustrative of an embodiment of luminaire 150 with transmissive lens element 170 in combination with reflector 125 that is able to generate an output beam with a sharply defined large angle intensity profile as described with reference to FIG. 6.

In one aspect, a portion of surfaces 171 and 173 near their intersection (illustrated as portion 191) are treated to induce scattering of incident light. Normally, surfaces 171 and 173 are specified to maximize optical transmission with a minimum of scattering. However, at their intersection, geometric imperfections may lead to discontinuities in light output that are visible in the output beam of luminaire 150 (e.g., "ghost" images visible in the output beam). To minimize these imperfections, it is desirable to introduce scattering of incident light over a limited area around the intersection of surfaces 171 and 173. In some embodiments, surface portion 191 is roughened to achieve the desired scattering. In some other embodiments, surface portion 191 is coated with a material that induces scattering (e.g., titanium dioxide (TiO2), zinc oxide (ZnO), and barium sulfate (BaSO4) particles, or a combination of these materials). In some other embodiments, it is desirable to absorb incident light over a limited area around the intersection of surfaces 171 and 173. In some embodiments, surface portion 191 is coated with a material that absorbs incident light (e.g., black pigment). The size of portion 191 may vary, but should remain small relative to the dimensions of surfaces 171 and 173. For example, portion 191 may include the internal radius that connects surfaces 171 and 173.

In another aspect, a portion of any of surfaces 172 and 174 near their intersection (illustrated as portion 190) are treated to induce scattering of incident light. Normally, surfaces 172 and 174 are specified to maximize optical transmission with a minimum of scattering. However, to minimize visible discontinuities in the output beam of luminaire 150, it is desirable to introduce scattering of incident light over a limited area around the intersection of surfaces 172 and 174. In some embodiments, surface portion 190 is roughened to achieve the desired scattering. In some other embodiments, surface portion 191 is coated with a material that induces scattering (e.g., titanium dioxide (TiO2), zinc oxide (ZnO), and barium sulfate (BaSO4) particles, or a combination of these materials). The size of portion 190 may vary. For example, as illustrated, portion 190 does not include surface 174, but extends along surface 172 from the point of intersection with surface 174. In the embodiment depicted in FIG. 7, portion 190 may extend along surface 172 approximately one millimeter from the intersection with surface 174. In some other embodiments, portion 190 may extend along the entire linear portion of surface 172. In some other embodiments, portion 190 may include all of surface 172. In some other embodiments, portion 190 may include a portion of surface 174.

In another aspect, an absorbtive material is located at the distal end of reflector 125 to absorb an amount of light exiting luminaire 150 at large angles. By absorbing this light, the light output of luminaire 150 at large angles may be further reduced. In some examples, the absorbtive material may a coating applied to a portion of reflector 125. In some other examples a separate part may be attached to reflector 125 that includes the absorbtive material. The absorbtive material can be any material suitable to absorb a significant portion of incident light (e.g., black paint, darkly pigmented plastic, etc.). Absortive material may be located over areas of varying size relative to reflector 125. For example, a reflector sized in accordance with FIG. 7 may include an additional area coated with an absorbtive material extending approximately 12 millimeters from the end of reflector 125.

Although certain specific embodiments are described above for instructional purposes, the teachings of this patent document have general applicability and are not limited to the specific embodiments described above. For example, any component of color conversion cavity 160 may be patterned with phosphor. Both the pattern itself and the phosphor composition may vary. In one embodiment, the illumination device may include different types of phosphors that are located at different areas of a color conversion cavity 160. For example, a red phosphor may be located on either or both of the insert 107 and the bottom reflector insert 106 and yellow and green phosphors may be located on the top or bottom surfaces of the output window 108 or embedded within the output window 108. In one embodiment, different types of phosphors, e.g., red and green, may be located on different areas on the sidewalls 107. For example, one type of phosphor may be patterned on the sidewall insert 107 at a first area, e.g., in stripes, spots, or other patterns, while another type of phosphor is located on a different second area of the insert 107. If desired, additional phosphors may be used and located in different areas in the cavity 160. Additionally, if desired, only a single type of wavelength converting material may be used and patterned in the cavity 160, e.g., on the sidewalls. In another example, cavity body 105 is used to clamp mounting board 104 directly to mounting base 101 without the use of mounting board retaining ring 103. In other examples mounting base 101 and heat sink 120 may be a single component. In another example, LED based illumination module 100 is depicted in FIGS. 1-3 as a part of a luminaire 150. As illustrated in FIG. 3, LED based illumination module 100 may be a part of a replacement lamp or retrofit lamp. But, in another embodiment, LED based illumination module 100 may be shaped as a replacement lamp or retrofit lamp and be considered as such. Accordingly, various modifications, adaptations, and combinations of various features of the described embodiments can be practiced without departing from the scope of the invention as set forth in the claims.

What is claimed is:

1. An apparatus comprising:
a light emitting diode (LED) based illumination device comprising at least one LED operable to emit an amount of light, the LED based illumination device having an optical axis;
a reflector element having an input port and an output port, the reflector element mounted to the LED based illumination device, wherein the light emitted from the at least one LED exits the LED based illumination device through the input port of the reflector element; and
a transmissive lens element including a first surface, a second surface, a third surface, and a fourth surface, wherein a first portion of the light emitted from the at least one LED passes through the first surface and the second surface, refracts toward the optical axis, and exits the output port of the reflector element without interacting with the reflector element, and wherein a second portion of the light emitted from the at least one LED passes through the third surface and the fourth surface, refracts away from the optical axis, is reflected by the reflector element, and exits the through the output port of the reflector element, and a scattering feature at an intersection of the first surface and the third surface, wherein the scattering feature is not present at a remainder of the first surface and a remainder of the third surface.

2. The apparatus of claim 1, wherein the at least one LED is mounted to a mounting board and the first surface is a planar surface oriented parallel to a surface of the mounting board.

3. The apparatus of claim 2, wherein the transmissive lens element is axi-symmetric about an axis oriented perpendicular to the mounting board.

4. The apparatus of claim 1, wherein the second surface is a convex surface.

5. The apparatus of claim 1, wherein the reflector surrounds the transmissive lens element and is spaced apart from the transmissive lens element.

6. The apparatus of claim 1, wherein the transmissive lens element is constructed from a transparent solid material.

7. The apparatus of claim 1, wherein the transmissive lens element is spaced apart from the at least one LED and the space between the transmissive lens element and the at least one LED is occupied by air.

8. The apparatus of claim 1, wherein the transmissive lens element is spaced apart from the at least one LED and the space between the transmissive lens element and the at least one LED is occupied by a solid, transparent material.

9. The apparatus of claim 1, wherein the scattering feature is selected from one of a coating that induces scattering and a roughening of the intersection of the first surface and the third surface.

10. An apparatus comprising:
a light emitting diode (LED) based illumination device comprising at least one LED operable to emit an amount of light, the LED based illumination device having an optical axis;
a reflector element having an input port and an output port, the reflector element mounted to the LED based illumination device, wherein the light emitted from the at least one LED exits the LED based illumination device through the input port of the reflector element; and
a transmissive lens element including a first surface, a second surface, a third surface, and a fourth surface, wherein a first portion of the light emitted from the at least one LED passes through the first surface and the second surface, refracts toward the optical axis, and exits the output port of the reflector element without interacting with the reflector element, and wherein a second portion of the light emitted from the at least one LED passes through the third surface and the fourth surface, refracts away from the optical axis, is reflected by the reflector element, and exits the through the output port of the reflector element, wherein the third surface is an exterior surface of the transmissive lens element and wherein the third surface is cylindrically tapered characterized by a first constant taper angle.

11. The apparatus of claim 10, wherein the fourth surface is cylindrically tapered surface characterized by a second taper angle.

12. An apparatus for forming an optical beam from an extended light source, comprising:
a reflector mounted to an LED based illumination device, the LED based illumination device having an optical axis, the reflector including a reflective surface area and an output port; and
a transmissive lens element including an interior surface area and an exterior surface area, the interior surface area surrounding and spaced apart from the LED based illumination device, the exterior surface area spaced apart from the reflector, the transmissive lens element comprising:
a first interior surface and a second interior surface disposed above the LED based illumination device;
a first exterior surface disposed in an optical path between the first interior surface and the reflector such that light passing through the first interior surface and the first exterior surface is refracted away from the optical axis; and
a second exterior surface disposed in an optical path between the second interior surface and the output port such that light passing through the second interior surface and the second exterior surface is refracted toward the optical axis; and
a scattering feature at an intersection of the first interior surface and the second interior surface, wherein the scattering feature is not present on a remainder of the first interior surface and a remainder of the second interior surface.

13. The apparatus of claim 12, wherein the at least one LED is mounted to a mounting board and the second interior surface is a planar surface oriented parallel to a surface of the mounting board.

14. The apparatus of claim 13, wherein the transmissive lens element is axi-symmetric about an axis oriented perpendicular to the mounting board.

15. The apparatus of claim 12, wherein the second exterior surface is a convex surface.

16. The apparatus of claim 12, wherein the first interior surface is cylindrically tapered characterized by a first taper angle.

17. The apparatus of claim 16, wherein the first exterior surface is cylindrically tapered characterized by a second taper angle.

18. The apparatus of claim 12, wherein the reflector surrounds the transmissive lens element and is spaced apart from the transmissive lens element.

19. The apparatus of claim 12, wherein the transmissive lens element is constructed from a transparent solid material.

20. The apparatus of claim 12, wherein the transmissive lens element is spaced apart from the at least one LED and the space between the transmissive lens element and the at least one LED is occupied by air.

21. The apparatus of claim 12, wherein the transmissive lens element is spaced apart from the at least one LED and the space between the transmissive lens element and the at least one LED is occupied by a solid, transparent material.

22. The apparatus of claim 12, wherein the scattering feature is selected from one of a coating that induces scattering and a roughening of the intersection of the first interior surface and the second interior surface.

* * * * *